US012572369B2

(12) United States Patent
Gupta et al.

(10) Patent No.: US 12,572,369 B2
(45) Date of Patent: Mar. 10, 2026

(54) DYNAMIC BMC FIRMWARE ORCHESTRATION FOR DC-SCM REPLACEMENT

(71) Applicant: American Megatrends International, LLC, Duluth, GA (US)

(72) Inventors: Chitrak Gupta, Kolkata (IN); Sriram Santhanam, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 171 days.

(21) Appl. No.: 18/420,552

(22) Filed: Jan. 23, 2024

(65) Prior Publication Data

US 2025/0238243 A1    Jul. 24, 2025

(51) Int. Cl.
*G06F 9/44*      (2018.01)
*G06F 9/445*     (2018.01)

(52) U.S. Cl.
CPC ................................ *G06F 9/44505* (2013.01)

(58) Field of Classification Search
CPC .................. G06F 1/32; G06F 9/44; G06F 1/12
See application file for complete search history.

(56) References Cited

U.S. PATENT DOCUMENTS

| | | | |
|---|---|---|---|
| 8,774,056 B2 * | 7/2014 | Lueckenhoff | ........... H04L 41/12 |
| | | | 370/255 |
| 11,516,082 B1 * | 11/2022 | Zhang | ................. H04L 41/0823 |
| 2006/0064542 A1 * | 3/2006 | Goodman | ............. G06F 3/0607 |
| | | | 711/170 |
| 2015/0178095 A1 * | 6/2015 | Balakrishnan | ........ G06F 13/364 |
| | | | 710/110 |

* cited by examiner

*Primary Examiner* — Keshab R Pandey
(74) *Attorney, Agent, or Firm* — Tim Tingkang Xia, Esq.; TROUTMAN PEPPER LOCKE LLP

(57)      ABSTRACT

In an aspect of the disclosure, a method, a computer-readable medium, and an apparatus are provided. The apparatus discovers the BMC within a network by scanning the network and listening for service discovery protocol messages. The apparatus collects device information from the BMC. The apparatus stores the collected device information in a configuration database. The apparatus determines whether there is a configuration change to be applied to the BMC by comparing the collected device information with a reference configuration. The apparatus configures the BMC with updated settings to apply the configuration change when it is determined that a configuration change needs to be applied.

18 Claims, 4 Drawing Sheets

100

DYNAMIC BMC FIRMWARE ORCHESTRATION FOR DC-SCM REPLACEMENT

BACKGROUND

Field

The present disclosure relates generally to computer systems, and more particularly, to techniques of dynamically updating and configuring firmware of a baseboard management controller (BMC) for Data Center Security and Control Module (DC-SCM) replacement.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus discovers the BMC within a network by scanning the network and listening for service discovery protocol messages. The apparatus collects device information from the BMC. The apparatus stores the collected device information in a configuration database. The apparatus determines whether there is a configuration change to be applied to the BMC based on the collected device information with a reference configuration. The apparatus configures the BMC with updated settings to apply the configuration change when it is determined that a configuration change needs to be applied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
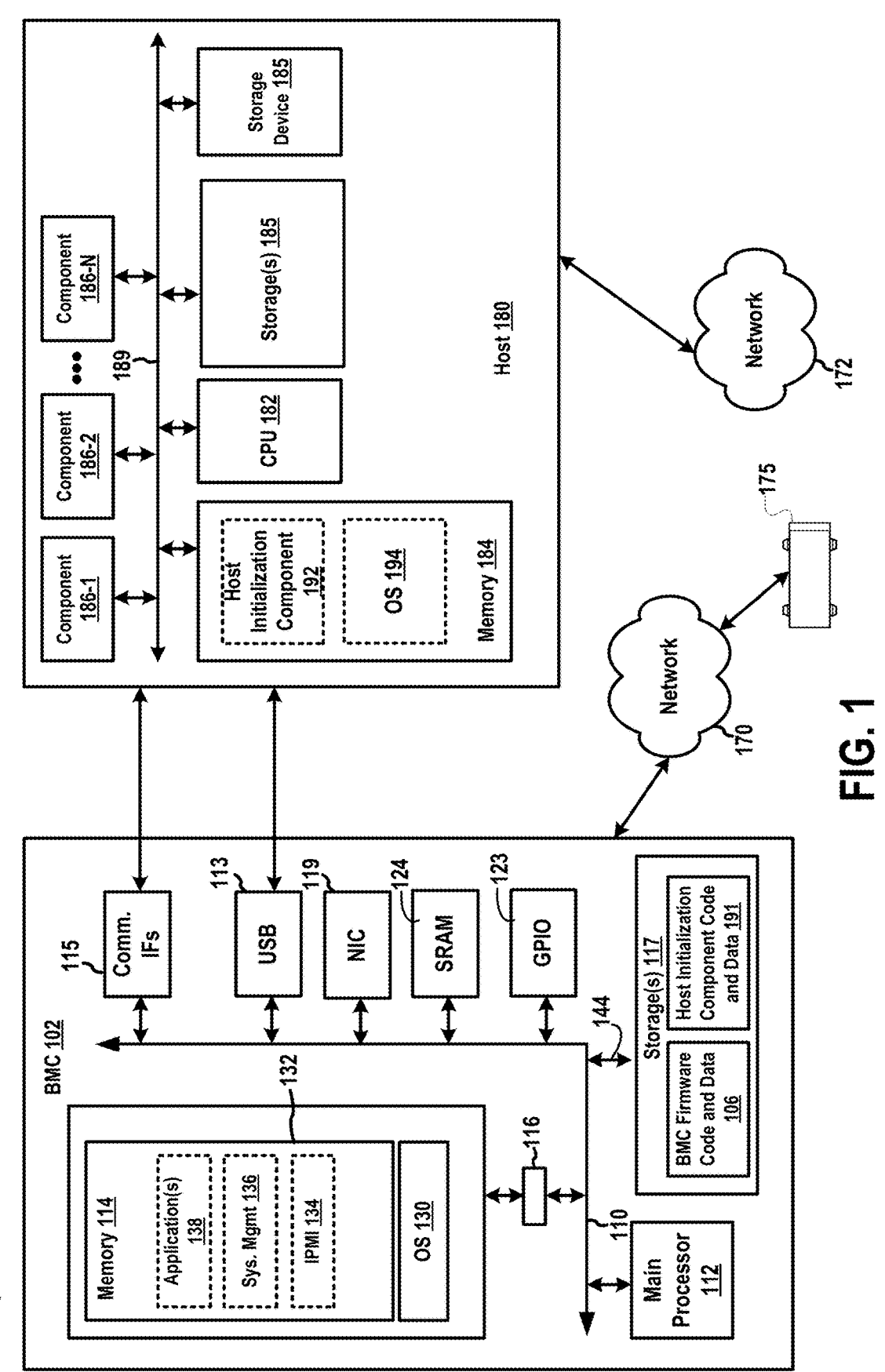
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170. Further, the storage(s) 117 is in communication with the communication channel 110 through a communication link 144.

The server market is currently witnessing a significant transformation due to most Original Equipment Manufacturers (OEMs) and Cloud Service Providers (CSPs) moving towards a modular hardware architecture in their server platforms. Open Compute Project (OCP) details the modularization criteria through its server hardware specifications. The idea behind this approach is to create a hardware ecosystem that is flexible, scalable, and easily upgradable, aligning with the rapid pace of technology advancements in server components.

The Data Center Ready-Modular Hardware System (DC-MHS) specification outlines the essential components of a modular platform. Key to this architecture is the facility it provides for CSPs and OEMs to upgrade existing systems without the need to invest in entirely new server platforms. The components within the servers, such as processors, storage devices, and management controllers, are designed to be replaceable or upgradable as individual units. This approach significantly reduces the Total Cost of Ownership (TCO) for the organizations, as components can be updated or replaced as needed, without a full system overhaul.

One of the primary benefits of adopting the DC-MHS guidelines is the agility it lends to system upgrades. Instead of the lengthy process traditionally involved in replacing or upgrading whole servers, modular components can be slotted in with minimal disruption, greatly accelerating the upgrade lifecycle and ensuring that server platforms can keep pace with evolving workloads and technological advancements.

A DC-MHS includes a Data Center Security and Control Module (DC-SCM). It incorporates essential subsystems such as the Baseboard Management Controller (BMC) stack and the Hardware Root of Trust (ROT).

The DC-SCM is a compact module designed as a daughter card to be integrated onto a server motherboard. The DC-SCM encapsulates several critical management functionalities that are central to the operation and integrity of the server system. The DC-SCM's infrastructure allows it to be easily swapped out or upgraded without the necessitation of replacing the entire server.

The DC-SCM includes a BMC stack. The BMC stack is responsible for the monitorization of the server's hardware state, facilitating remote management capabilities such as power control, system restoration, and logging. The BMC supports the server's lifecycle by providing diagnostic tools, the ability to update firmware, and manage hardware settings even when the server OS is not running. The modularity of BMC within the DC-SCM means that, as server management needs evolve or as new BMC technology gets introduced, the BMC functionality can be updated or replaced independent of other hardware components.

The DC-SCM includes a Hardware Root of Trust (ROT). The ROT is essentially a trusted source of verification for software and firmware loads on the server, establishing a baseline of trust for all operations. It ensures that only signed, verified code is executed on startup to prevent unauthorized firmware from compromising server integrity. The ROT mechanism functions as the root for all trust chains on the server, and integrating it within the DC-SCM enables a secure boot process.

The DC-MHS further includes a Host Processor Module (HPM). The HPM functions as the 'brain' of the system, hosting processors such as CPUs (Central Processing Units), GPUs (Graphics Processing Units), IPUs (Infrastructure Processing Units), DPUs (Data Processing Units), and accompanying DIMMs (Dual Inline Memory Modules) to provide computing and processing capabilities necessary for running applications and managing workloads.

With the modular approach of DC-MHS, the HPM, including its various processor types and memory, becomes a replaceable unit within the server architecture. Such modularity permits on-the-fly upgrades of the HPM to adapt to new technologies, workloads, or performance goals without the need for comprehensive system replacement. From swapping an outdated CPU to a more powerful one or adding high-capacity DIMMs, the HPM acts as an interchangeable module, facilitating seamless transitions and continuous performance optimization.

The DC-MHS also includes Modular I/O (DC-MIO). The DC-MIO deals with the varied input/output requirements of modern data centers, encapsulating subsystems for storage, network interface cards (NICs), accelerators, and a range of interconnect technologies. These modular components are utilized for a server's connectivity and throughput capabilities to specific workload demands.

The DC-MHS also utilizes SMART Network Interface Cards (NICs) and Data Plane technologies. SMART-NICs are advanced network cards with built-in processors-often based on Field-Programmable Gate Array (FPGA) technology or specific multicore CPUs—that can offload processing tasks from the server's central processing units (CPUs). These network interface cards enable sophisticated processing at the network edge, closer to where data is entering or leaving the server. This form of processing enables efficient data plane operations-those tasks concerned with the forwarding of data packets through the network.

The modular architecture of the DC-MHS improves server upgradeability and system management.

The DC-MHS utilizes modular hardware, enabling easy replacement of components and facilitating easy upgrades. Individual components of the DC-MHS, such as the Host Processor Module (HPM), the DC-SCM, and the Modular I/O, can be interchanged without the requirement of overhauling the entire server infrastructure.

Changes in the HPM can result in the creation of entirely new systems. An HPM upgrade, such as the replacement of a CPU with a more advanced variant, transforms the system's capabilities, aligning it with current performance requisites or specific computational needs.

The modular architecture enables a pay-as-you-go model. This model allows for incremental investments, where CSPs and OEMs can strategically upgrade hardware components based on evolving performance requirements or budget considerations, as opposed to incurring the cost of complete server replacements.

Changes to platform devices necessitate dynamic firmware capabilities, to ensure that upgrades or alterations in hardware are adequately supported by the system's software. An adaptable firmware framework can respond to changes in the HPM or other components, thus maintaining the integrity and functionality of the server's operations. The adaptable firmware framework serves this purpose by dynamically constructing firmware images tailored to the new configuration.

With the advent of a modular design, device and sensor configurations are no longer static but become dynamic entities within the server ecosystem. As components are added, removed, or upgraded, sensor configurations adapt accordingly, ensuring the ongoing accurate monitoring and management of server health and performance parameters.

Further, the DC-SCM enables changes to be made in the management module. Accordingly, the BMC firmware are readily adaptable to support fresh deployments or upgrades.

Figure 2:
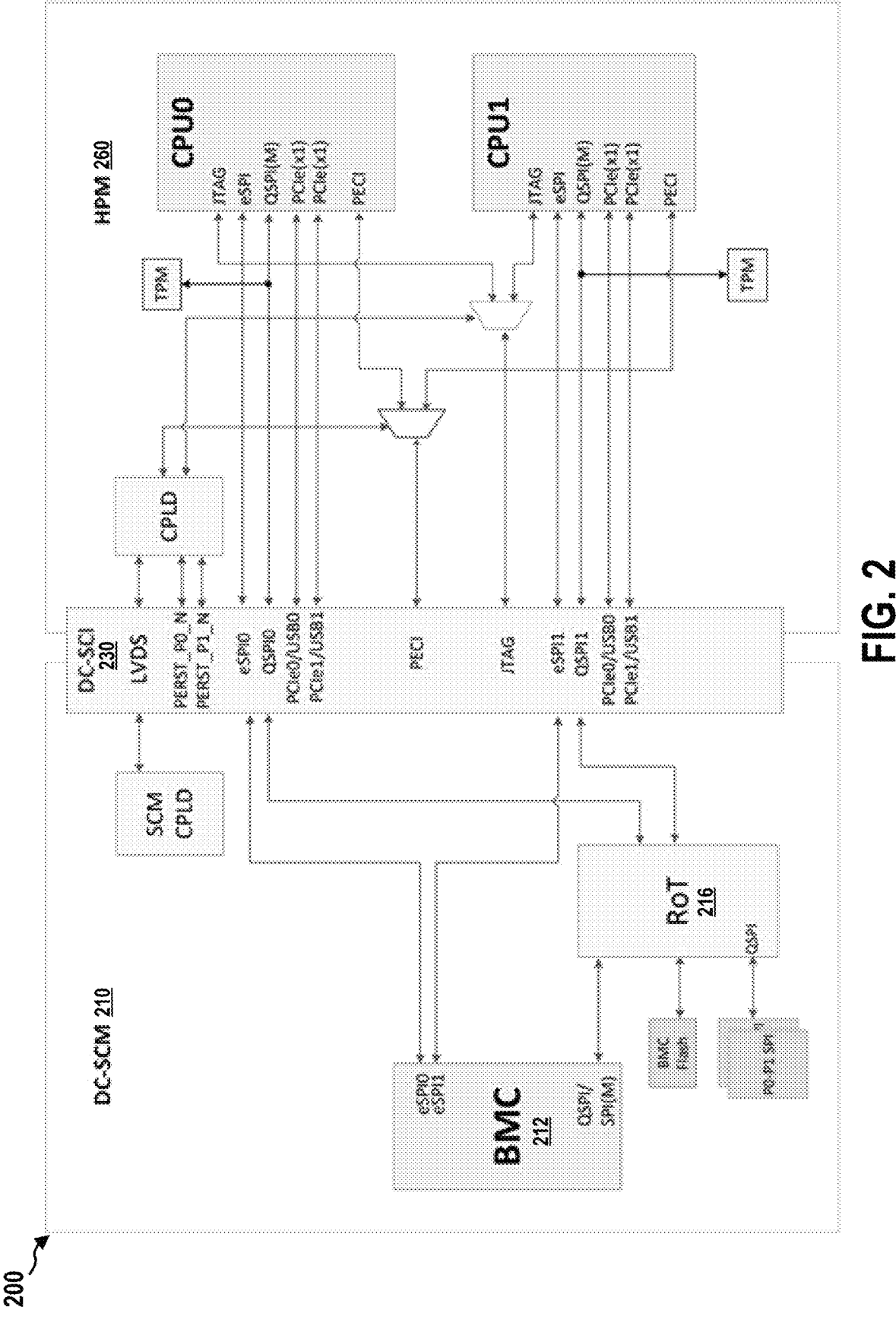
FIG. 2 is a diagram illustrating a modular hardware system.

FIG. 2 is a diagram illustrating a modular hardware system 200. The modular hardware system 200 includes a DC-SCM 210, a HPM 260. The DC-SCM 210 includes a BMC 212 and ROT 216, and a Data Center System Connection Interface (DC-SCI) 230. The HPM 260 includes a CPU0 and a CPU1. The DC-SCM 210 and the HPM 260 are connected via the DC-SCI 230. The DC-SCI 230 serves as the foundational communication backbone connecting the Data Center Security and Control Module (DC-SCM) 210 with the Host Processor Module (HPM) 260. It is equipped with a variety of interfaces and protocols designed to ensure a seamless and efficient data flow between the various server modules.

In the modular hardware system 200, the BMC 212 is part of the DC-SCM 210 and adheres to the specifications of the DC-SCM 210. As a replaceable unit within the DC-SCM 210, the BMC 212 may be transitioned between different BMC System-on-Chip (SOC) components provided by the OEMs and CSPs. Deployable firmware images may be supplied for these BMC modules. That is, the firmware are as interchangeable as the hardware components it manages. For example, the OpenBMC firmware is often used.

The Host Processor Module (HPM) may change in a DC-MHS system. In the example of FIG. 2, the HPM 260 functions as the computing module or "brain" of the modular hardware system 200, hosting processors such as CPUs and GPUs along with memory. If the HPM 260 is upgraded or swapped out, it essentially changes the platform, as a new compute module is introduced. For example, the CPU0 and CPU1 in the existing HPM 260 could be replaced with a newer generation processor. The DC-SCI 230 provides standardized connectivity between the HPM and other modules such as the DC-SCM 210, abstracting low-level interface details. However, the BMC 212 in the DC-SCM 210 still needs awareness of the physical interfaces provided by a new HPM for proper management and monitoring. The BMC 212, residing in the DC-SCM 210, recognizes these changes and interacts appropriately with the new physical interfaces provided by the altered HPM.

The BMC 212 encapsulated in the DC-SCM 210 may also change. As a replaceable daughter card unit, an outdated BMC 212 SOC component may be upgraded to a newer generation BMC SOC with different firmware requirements. Customers utilizing AMI's BMC firmware stack require the flexibility to Tailored BMC firmware images may be built and deployed for any SOC and platform combination that may arise from BMC swaps. That is, the necessary BMC firmware may be generated on-the-fly to accommodate both the SOC and platform configurations. The BMC image should also inherit necessary configurations from the previous BMC while seamlessly supporting the new module.

Device configurations in the modular hardware system 200 are expected to change over time due to hardware lifecycle management involving addition, removal, or upgrades of devices. The BMC firmware has capabilities to dynamically handle such changes in devices and sensors, discovering new devices added and managing them appropriately. The BMC 212 can handle device changes occurring.

The DC-SCI 230, as the primary conduit for communication and interaction among the modular components of the DC-MHS, adheres to a set standard specification. This standardization ensures that, despite the mutable nature of the aforementioned elements (HPM, BMC, and device configurations), the foundational interconnectivity remains consistent and reliable. The DC-SCI 230's role is to provide a stable and secure platform upon which these interchangeable components can operate cohesively.

In the modular hardware system 200 shown in FIG. 2, the DC-SCM 210 and HPM 260 are separate replaceable modules connected via the DC-SCI 230 interface. As discussed, the HPM 260 as the compute module can be swapped out or upgraded, essentially changing the platform. Similarly, the BMC 212 within the DC-SCM 210 is a replaceable daughter card unit that can also be changed to a newer generation BMC SOC.

To handle such mutable components and platforms, the BMC firmware also has portability. The firmware is configurable to support any alterations occurring in modules of the modular hardware system 200 such as the HPM 260 or BMC 212. For example, if the HPM 260 is swapped from one processor to another, the firmware of the BMC 212 can dynamically handle the new physical interfaces and devices presented by the changed HPM module.

Further, if the BMC 212 itself is upgraded to a newer SOC generation with different firmware requirements, the modular approach allows tailored BMC firmware images to be constructed on-the-fly based on both the new SOC and platform combination. A build orchestration system maintains repositories of SOC drivers, bootloaders, porting components etc. that can be pulled in dynamically to generate firmware images compatible with the new configurations. This firmware portability allows the BMC 212 to adapt to changes in the modular hardware system 200.

The BMC firmware architecture is a framework that includes Intellectual Properties (IP) and abstraction layers that cater to various silicon (i.e., processors) providers (e.g., Intel, AMD, NVIDIA, Qualcomm, and ARM). This multi-tiered architecture comprises the following features:

Silicon Provider IP: This represents the proprietary technology or IP provided by the silicon manufacturers. For example, it includes specific drivers or firmware necessary to interact with CPUs such as CPU0 and CPU1 of the HPM 260.

CSP IP: Cloud Service Provider (CSP) specific IPs that are tailored to the requirements of service providers managing cloud infrastructure.

BMC Vendor IP: BMC Vendor contributes its proprietary IP as part of the firmware stack, ensuring integration with its suite of deployment and management tools.

Application Abstraction (SDK): An SDK (Software Development Kit) layer abstracts the underlying complexity and provides a standardized set of tools for application development.

Platform Abstraction (PDK): The Platform Development Kit (PDK) encapsulates platform-specific information and abstracts the complexities of hardware interaction. It aids in the discovery, management, and monitoring of devices and sensors connected to the modular server system.

SOC Abstraction (HAL): A Hardware Abstraction Layer (HAL) that provides SOC-specific interfaces, thus creating a separation between the hardware specifics and the firmware logic.

OpenBMC: A base framework for BMC firmware development.

These components of the BMC firmware architecture enable the firmware to dynamically handle each unique platform configuration, such as when the BMC 212 interfaces the HPM 260 whose components have been changed.

The SOC Abstractions may be provided within the Yocto build framework. The Yocto build framework is an open source tool for building custom Linux-based systems for embedded and IoT devices. The SOC abstraction layers provided by Yocto enables portability across different BMC SOCs. As part of the firmware architecture, abstractions for the BMC System-on-Chip (SOC) are provided in case the DC-SCM module containing the BMC is changed. The Yocto build framework provides these abstractions through modular metadata layers specific to each SOC.

These meta-<soc> layers contain the recipes, packages, configuration files etc. required to build the BMC firmware image for that particular SOC. For example, the meta-aspeed layer has everything needed to compile the firmware for an Aspeed AST2500 or AST2600 SOC. This includes the Linux kernel, bootloaders, drivers, libs, apps, configs etc. Similarly, there can be a meta-nuvoton layer for Nuvoton NPCM7xx SOCs.

If the hardware changes from Aspeed SOC to Nuvoton, a Build Orchestrator tool will include the meta-nuvoton layer instead of meta-aspeed during image generation. As such, the abstraction layers enable porting the firmware across different BMC SOC hardware with minimal changes to the rest of the firmware stack. When BMC hardware upgrade happens by replacing the BMC 212 with a newer generation BMC System-on-Chip (SOC), a tailored BMC firmware image are loaded promptly on the new module to minimize server downtime.

To enable rapid roll-out of firmware, the Build Orchestrator system maintains repositories of pre-built components such as kernel, bootloaders, configuration files etc. for various BMC SOCs. Specifically, the Yocto meta-layers contain modular recipes to build BMC firmware for a particular SOC. When the BMC 212 SOC is changed, the Build Orchestrator identifies the target hardware and injects the appropriate meta-layer into the build process to generate firmware with relevant kernel, drivers, libs suited to the new BMC chip. Additionally, Platform Configuration Capsules store modular device configurations needed for discovery and sensor management on that specific server platform. By bringing together these hardware-specific modules at build time, the orchestration system can synthesize a customized, production-grade BMC image for deployment on the new DC-SCM BMC card. Thus, the configurable modular architecture enables rapid roll-out of tailored firmware to support hardware upgrades in line with the dynamic nature of modular platforms.

In the modular hardware system 200, the platform configuration for the BMC 212 can be abstracted through modular platform-specific files handled dynamically at runtime. When the system changes due to HPM 260 alterations or other device modifications, corresponding platform-specific files are provided to the BMC 212 firmware to handle the new configuration.

These platform-specific files enabling device discovery, sensor monitoring, event actions etc. are packaged into modules called platform configuration capsules (PCCs). The PCCs may contain one or more of the following:

Sensor Data Record (SDR) information: Detailing the mappings of sensors to their respective I2C buses within the modular server system, aiding in prescient sensor management.

Platform event filter configurations: Seizing event messages tailored to specific chips—akin to Intel or any emerging variant—and configuring responsive actions pertinent to such events.

Vendor platform-specific libraries and configurations, including Entity manager JSON files: Governing the establishment of settings and standards aligned with the AMI intellectual property's requirements.

Platform-specific static tables, Management Controller Transport Protocol (MCTP) endpoint tables, Platform Level Data Model (PLDM) Platform Descriptor Records (PDRs): Furnishing static references which are instrumental for the identification and communication with different platform components.

Power and thermal configurations and algorithms: Regulating the server's thermal profile and energy consumption, pivotal for maintaining operational efficiency and integrity within the DC-MHS.

For example, an "archercity" platform will have an archercity.pcc capsule. The PCC files packages are bound to the server platform with unique identifiers. The PCC files packages are accessible for download and integration at runtime from EMMC storage or a deployment cloud, For example, when the HPM 260 changes prompting an image rebuild, the appropriate PCC capsule for the new platform is downloaded by the BMC 212 providing the URL. The BMC 212 notifies the build orchestrator of HPM or device changes, passing the CPU info to build a tailored image.

Thus, platform-specifics are abstracted into modular PCCs handled dynamically allowing portable BMC 212 firmware across hardware changes like HPM swaps. The interconnect DC-SCI 230 remains standard between DC-SCM 210 and mutable modules like HPM 260. This firmware portability supports the flexible hardware upgrades in line with the dynamic modular architecture.

Figure 3:
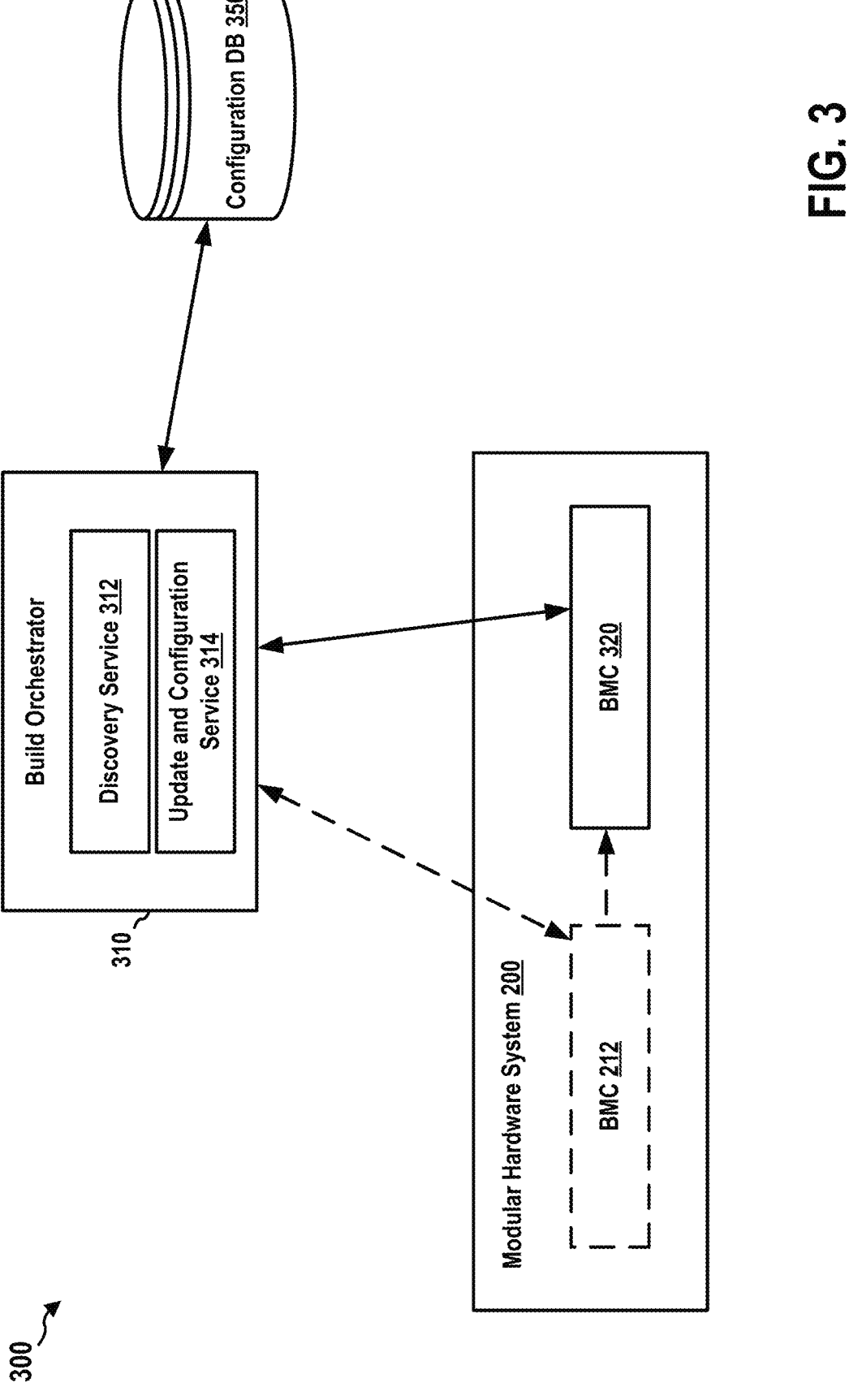
FIG. 3 is a diagram illustrating a build orchestrator.

FIG. 3 is a diagram 300 illustrating a build orchestrator 310. The build orchestrator 310 includes a discovery service 312 and an update and configuration service 314, and is in communication with a configuration database 350.

The build orchestrator 310 automates the process of constructing firmware images that are tailored to the specific configurations of the the modular hardware system 200's hardware. The build orchestrator 310 may continuously monitor the modular hardware system 200 for any events that signal changes in the hardware configuration. These changes may involve the HPM 260, which includes CPU0 and CPU1, or the BMC 212 embedded within the DC-SCM 210. When such an event is detected, the build orchestrator 310 is responsible for initiating a build process that assembles a new firmware image compatible with the updated hardware setup.

An orchestration process executed by the build orchestrator 310 involves managing a repository of firmware components, which includes drivers, bootloaders, and platform-specific configurations. The build orchestrator 310 uses this repository to put together a firmware image that aligns with the new configuration of the system's hardware.

The build orchestrator 310 may leverage a Yocto-based build framework to compile the necessary components and generate the firmware image. This includes selecting the appropriate Yocto meta-layers that correspond to the System-on-Chip (SOC) used in the BMC 212 or other hardware components that have undergone changes. Once the firmware image is constructed, the build orchestrator 310 oversees its deployment to the BMC 212, which may require the BMC to enter flash mode for the firmware update and subsequently reboot the system to apply the new configuration.

Additionally, the build orchestrator 310 provides an Application Programming Interface (API) that enables the BMC 212 to communicate hardware changes and request the generation of new firmware images. This API facilitates automated interactions between the BMC 212 and the build orchestrator 310, allowing for real-time updates and modifications to the firmware in response to changes within the hardware system.

The build orchestrator 310 maintains the firmware's integrity and compatibility within the modular hardware system 200. The updated firmware remains synchronized with the hardware configuration, whether it pertains to the processors within the HPM 260, the management components within the DC-SCM 210, or the protocols managed by the DC-SCI 230.

In data center server management, a significant challenge arises when dealing with the replacement of modular hardware components, specifically the BMC within the DC-SCM. The DC-SCM is an integral part of the modular hardware system, which allows for the convenient upgrade and replacement of server components. In particular, the BMC firmware needs to be updated to the latest version and reconfiguring the BMC post-replacement to match the previous settings. This process is essential to maintain the integrity and continuity of the server's operations.

In this example, the BMC 212 of the modular hardware system 200 is replaced with a BMC 320 (such as the transition from an Aspeed AST2600 to an AST2700). The replacement process needs to avoid the loss of critical configurations and to leverage the improved capabilities of newer BMC models. Accordingly, the build orchestrator 310 aims to monitor changes in each node of the data center, capturing the characteristics and configurations that define their operation.

A key challenge highlighted is the potential loss of configurations when the DC-SCM 210 or the HPM 260 of the modular hardware system 200 is replaced. These configurations may include user credentials, RAID settings, inventory details, certificates, and other security parameters. In the modular hardware system 200, components such as the HPM 260 and the DC-SCM 210 are subject to upgrades that can lead to the need for reconfiguration. The traditional method of storing configurations on a partition within the BMC is not viable when the entire card is replaced. Therefore, a robust mechanism is required to securely manage and restore configurations across potentially thousands of nodes in a data center.

The build orchestrator 310 manages firmware versions across a vast array of managed entities such as platforms, Baseboard Management Controllers (BMCs), and devices within the data center. The build orchestrator 310 may be deployed either on an organization's premises or through a public cloud infrastructure provided by a vendor. Data centers are evolving towards a modular architecture to enhance scalability and adaptability. The build orchestrator 310, with its two primary services-a) the discovery service 312 and b) the update and configuration service 314 manage the firmware to align with this modular approach.

The discovery service 312 is responsible for discovering BMCs within the network. This service utilizes protocols such as Redfish to initiate a sweep across the network IP range, sending discovery messages to enumerate BMC entities, as exemplified by a GET request to the resource 'https://<IP>/redfish/V1'. Redfish is an industry-standard specification designed to deliver simple and secure management of modern hardware systems. The discovery service sweeps the network, cataloging each BMC present, and compiling essential data into a structured format. Additionally, the discovery service 312 listens for service discovery protocol messages, such as SLP or Avahi, broadcasted by the BMC firmware in the network.

Once a BMC (e.g., initially the BMC 212) is discovered in the network, the discovery service 312 creates a data entry in the configuration database 350. The data entry encompasses details such as platform inventory, BMC SOC type, firmware versions, and generates a JSON configuration file with relevant platform, BMC, and device attributes.

When a new or updated BMC, such as the BMC 212, comes online within the network, it is for the discovery service 312 to discover it and integrate it efficiently into the server environment. Upon the detection of a BMC within the network, the discovery service 312 initiates a data collection process. This process involves creating a detailed data entry for the discovered BMC, which is then stored within the configuration database 350. The discovery service compiles a list of attributes, including the platform inventory associated with the DC-SCM 210, the specific System-on-Chip (SOC) type used in the BMC, current firmware versions, and other relevant device attributes. This information is organized into a JSON configuration file, providing a structured representation of the system's operational parameters.

The configuration file serves as a blueprint for system configurations and guides subsequent firmware updates or replacements. One exemplary data entry constructed by the discovery service can be represented as follows:

| BMC IP | HPM Type | Server UID | SOC Type | FW Version | Configuration File Path |
|---|---|---|---|---|---|
| A.B.C.D | Intel x86 | aabbcccdd | AST2600 | x.y.z | //config.json |

BMC IP: This column contains the IP address (A.B.C.D) of the discovered BMC on the network. It is the unique identifier used to communicate with the BMC over the network, allowing for remote management and monitoring.

13

-continued

| BMC IP | HPM Type | Server UID | SOC Type | FW Version | Configuration File Path |
|---|---|---|---|---|---|

HPM Type: The "HPM Type" indicates the type of Host Processor Module associated with the BMC. In this case, it specifies an "Intel x86" processor architecture. This information is critical for understanding the computing environment and ensuring compatibility with firmware and hardware operations.

Server UID: "Server UID" is a unique identifier (aabbccdd) assigned to the server or hardware platform in which the BMC is installed. It helps in distinguishing this particular server from others in the data center.

SOC Type: The "SOC Type" specifies the model of the System-on-Chip used in the BMC, such as "AST2600." SOC type may be used to identify compatible firmware, understanding the capabilities of the BMC, and facilitating upgrades or replacements.

FW Version: This represents the firmware version (x.y.z) currently installed on the BMC. Firmware version tracking is used to maintain software up-to-date with the latest features, security patches, and bug fixes.

File: The "File" column provides a path or reference to a JSON configuratio file (//config.json) that contains detailed platform-specific, BMC-specific, and device-specific attributes. This file is used for configuration management as it encapsulates all necessary settings required for the BMC to interact correctly with its environment.

In this example, when the BMC 320 is plugged into the modular hardware system 200, as part of a DC-SCM 210 replacement, to replace the BMC 212, there are two scenarios related to its IP address. In a first scenario, the IP address of the BMC 320 stays the same as the BMC 212. In this scenario, when the discovery service 312 re-collects device information from the BMC 320 via the REDFISH protocol, the update and configuration service 314 would recognize that the System-on-Chip (SOC) type has changed. The update and configuration service 314 is then triggered to push updated firmware and configuration to the BMC 320.

In a second scenario, the IP address of the BMC 320 changes to a different address than that of the BMC 212. This can happen if the BMC 320 obtains an IP via DHCP instead of static assignment. In this case, the discovery service 312 detects the BMC 320 at the new IP address and is not able to associate the new BMC with the existing server record. However, the server UUID is an immutable identifier that uniquely identifies the server chassis, regardless of changes to its components such as the Host Processor Module (HPM 260) or the BMC itself. Accordingly, the update and configuration service 314 looks up the server record using this UUID in the configuration database 350. Once found, the update and configuration service 314 can obtain inventory details such as the new BMC IP, SOC type etc. Then the firmware build and BMC configuration process is kickstarted by the update and configuration service 314.

Thus, depending on whether the BMC IP address changed on replacement, the update and configuration service 314 can determine the appropriate workflow-either simple Redfish rediscovery if IP unchanged, or the more complex UUID lookup and inventory update mechanism if the IP changed.

The build orchestrator's 310 discovery service 312 regularly scans the network and maintains an inventory of BMCs discovered. This includes details like the BMC IP, server UID, SOC type, firmware version etc. The update and configuration service 314 continuously monitors the configurations of each node device (e.g., the modular hardware system 200) within the data center, recording any changes of the configurations in the configuration database 350. This process is not a one-time event but rather a periodic activity. The cadence of these updates can be adjusted according to data center policy—be it monthly, bi-monthly, or another suitable interval.

In the above example, if a new IP address for the BMC 320 is detected, this indicates to the update and configuration service 314 that a replacement has occurred. Further, if the BMC 320 is at the same IP address A.B.C.D associated with the same server UID "aabbccdd" of the modular hardware system 200 reports a new AST2700 SOC type instead of the original AST2600 for, it indicates that the BMC 212 has been replaced by the BMC 320. Those events trigger the update and configuration service 314 to initiate firmware build and configuration update processes.

Subsequently, the update and configuration service 314 first collects the current firmware version flashed on the BMC 320 and firmware configurations. The update and configuration service 314 may store that device information in the configuration database 350. The BMC 320 may come pre-flashed with firmware from the factory but may not include the latest security patches or updates. The update and configuration service 314 obtains the device information of the BMC 212 from the configuration database 350. The update and configuration service 314 compares the device configuration of the BMC 212 with the device configuration of the BMC 320 to determine whether any additional changes need to be made to the firmware of the BMC 320.

If a newer version of firmware for the BMC 320 is available, the update and configuration service 314, initiates a new build for the BMC 320 with the platform configuration. Similarly, the build orchestrator 310 may build a new firmware for the entire DC-SCM 210 if any other platform modules within the DC-SCM 210 also have been changed.

The update and configuration service 314 maintains a configuration file for the BMC 320. The configuration file is a repository of all attributes required to keep the BMC 320 operating at the desired level of performance and security. Any changes in firmware versions or configurations are collected and stored in this file. When replacements occur, such as the replacement of the BMC 212 with the BMC 320, the update and configuration service 314 compares the current configuration of the BMC 320 with a "gold version", which is a reference configuration that represents the optimal or intended state. Through this comparison, necessary adjustments are identified and applied to align the new BMC 320 with the data center's operational standards.

Figure 4:
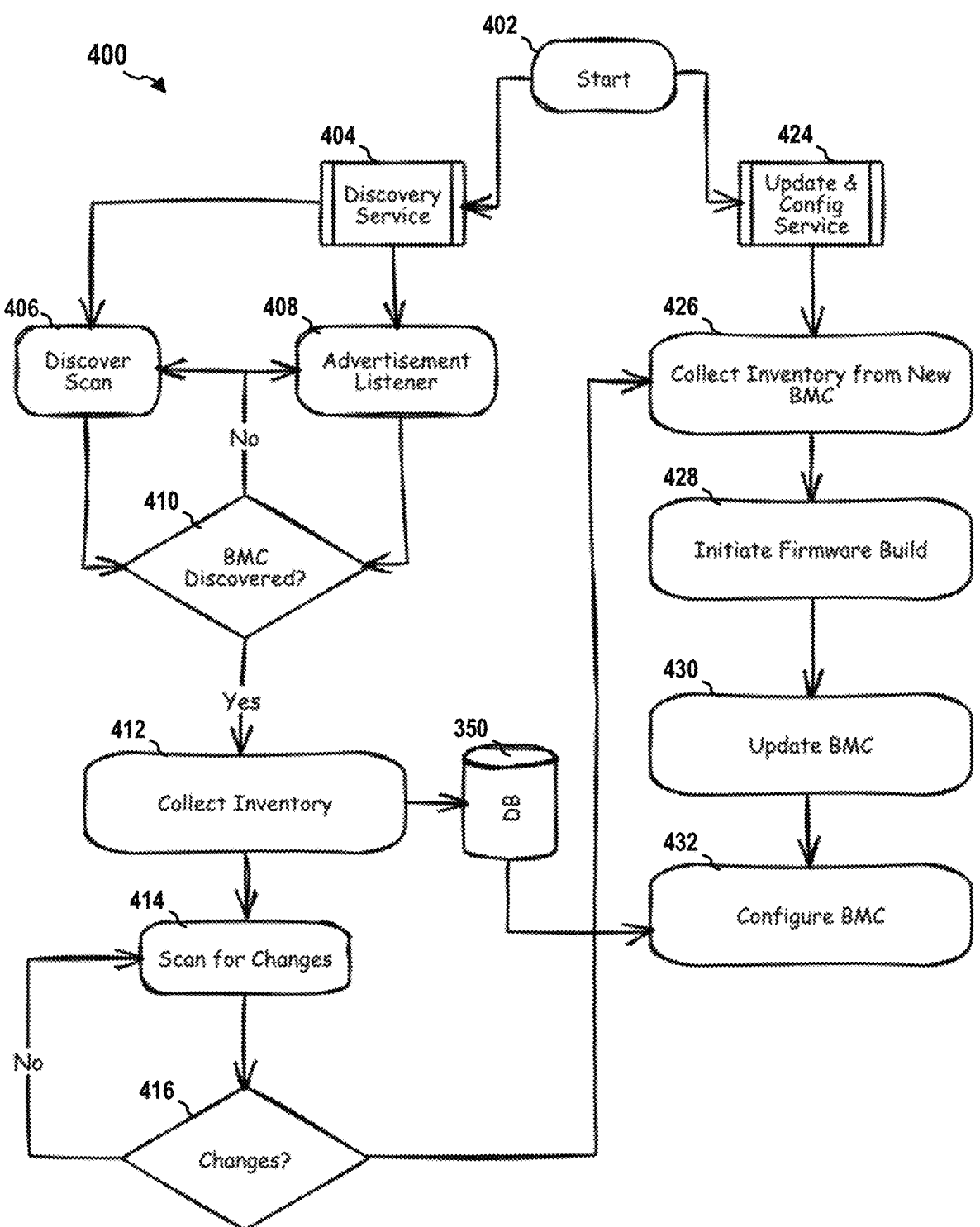
FIG. 4 is a flow chart illustrating operations of the build orchestrator.

FIG. 4 is a flow chart 400 illustrating operations of the build orchestrator 310. In operation 402, the build orchestrator 310 starts its operations. The build orchestrator 310 is responsible for managing the firmware and configurations of the modular hardware system 200's hardware components, including the BMC 212 embedded within the DC-SCM 210 and the HPM 260.

In operation 404, the build orchestrator 310 initiates the discovery service 312. The discovery service 312 is responsible for discovering BMCs within the network. Concurrently with operation 404, in operation 424, the build orchestrator 310 initiates the update and configuration service 314. The update and configuration service 314 is responsible for updating the firmware and configurations of the BMCs.

Following operation 404, in operation 406, the discovery service 312 starts scanning the network for BMCs. It may use protocols such as Redfish to initiate a sweep across the network IP range, sending discovery messages to enumerate BMC entities.

Concurrently with operation 406, in operation 408, the discovery service 312 initiates the advertisement listener to listens for service discovery protocol messages, such as SLP or Avahi, broadcasted by the BMCs in the network. The BMCs in the network advertises its presence in the network. This allows the BMCs to connect to the discovery service 312 and provide information about their hardware and firmware configurations.

In operation 410, the discovery service 312 checks if a new BMC has been discovered in the network. As described supra, the discovery service 312 may discovers a BMC with a new IP address or a BMC at an existing IP address that has changed its SOC type. If a BMC is discovered, the discovery service 312 proceeds to operation 412. Otherwise, it goes to operations 406 and 408.

In operation 412, the discovery service 312 collects inventory information from the discovered BMC. This information includes the BMC's IP address, server UID, SOC type, firmware version, and other relevant attributes as described supra. The discovery service 312 stores this information in the configuration database 350.

In operation 414, the discovery service 312 scans for changes to be applied in the hardware or firmware configurations of the discovered BMCs. This process is done periodically to ensure that the discovery service 312 has an up-to-date view of the system's hardware and firmware configurations.

In operation 416, the discovery service 312 checks if there are any changes to be applied to the hardware or firmware configurations of the discovered BMCs. If there are no changes, the discovery service 312 goes back to operation 414. Otherwise, it proceeds to operation 426.

In operation 426, the update and configuration service 314, after being initiated in operation 424, collects inventory information from the new BMC. This information includes the BMC's IP address, server UID, SOC type, firmware version, and other relevant attributes. The update and configuration service 314 stores this information in the configuration database 350. The update and configuration service 314 compares the inventory information of the new BMC with the inventory information of the old BMC. This allows the update and configuration service 314 to determine which firmware and configuration updates need to be applied to the new BMC.

In operation 428, the update and configuration service 314 initiates a firmware build for the new BMC. The firmware build is based on the inventory information of the new BMC and the firmware and configuration updates that need to be applied.

In operation 430, the update and configuration service 314 updates the firmware of the new BMC. The firmware update is performed using a secure protocol to ensure that the firmware is not corrupted during the update process.

In operation 432, the update and configuration service 314 configures the new BMC. The configuration is based on the inventory information of the new BMC and the firmware and configuration updates that need to be applied.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of configuring a baseboard management controller (BMC), comprising:
   discovering the BMC within a network based on network scanning and listening for service discovery protocol messages;
   collecting device information from the BMC;
   storing the collected device information in a configuration database;
   determining whether there is a configuration change to be applied to the BMC based on the collected device information and a reference configuration;
   configuring the BMC with updated settings to apply the configuration change, in response to determining that there is a configuration change to be applied;
   determining whether there is a firmware change to be applied to the BMC based on the collected device information and the reference configuration;
   constructing a firmware build for the BMC, in response to determining that there is a firmware change to be applied; and
   updating the firmware of the BMC based on the firmware build.

2. The method of claim 1, wherein the BMC is discovered in accordance with a REDFISH protocol.

3. The method of claim 1, wherein the configuration changes include at least one of updates to user credentials, Redundant Array of Independent Disks (RAID) settings, inventory details, certificates, and security parameters.

4. The method of claim 1, wherein the discovering, collecting, and storing operations are performed periodically according to a data center policy.

5. The method of claim 1, wherein the collected device information includes at least one of an IP address, server universal unique identifier (UUID), a System-on-Chip (SOC) type, and a firmware version associated with the BMC.

6. The method of claim 1, further comprising:
   determining current configuration of the BMC from the collected device information, wherein the determining whether there is a configuration change to be applied to the BMC includes a comparison of the current configuration of the BMC with the reference configuration.

7. The method of claim 1, further comprising:

monitoring for events signaling changes in hardware configuration of a modular hardware system, wherein the BMC is discovered as a changed component in the modular hardware system; and initiating a build process to assemble a new firmware image compatible with the updated hardware setup of the modular hardware system in response to detecting the BMC as a changed component.

8. The method of claim 1, wherein the configuration database maintains a configuration file for the BMC as a repository of attributes for operating the BMC.

9. The method of claim 1, further comprising:

continuing to scan for changes of BMCs in the network and update the configuration database after another new BMC is discovered and configured.

10. An apparatus for configuring a baseboard management controller (BMC), comprising:

a memory; and at least one processor coupled to the memory and configured to:

discover the BMC within a network based on network scanning and listening for service discovery protocol messages;

collect device information from the BMC;

store the collected device information in a configuration database;

determine whether there is a configuration change to be applied to the BMC based on the collected device information and a reference configuration;

configure the BMC with updated settings to apply the configuration change, in response to determining that there is a configuration change to be applied;

determine whether there is a firmware change to be applied to the BMC based on the collected device information and the reference configuration;

construct a firmware build for the BMC, in response to determining that there is a firmware change to be applied; and update the firmware of the BMC based on the firmware build.

11. The apparatus of claim 10, wherein the BMC is discovered in accordance with a REDFISH protocol.

12. The apparatus of claim 10, wherein the configuration changes include at least one of updates to user credentials, Redundant Array of Independent Disks (RAID) settings, inventory details, certificates, and security parameters.

13. The apparatus of claim 10, wherein the at least one processor is further configured to perform the discovering, collecting, and storing operations periodically according to a data center policy.

14. The apparatus of claim 10, wherein the collected device information includes at least one of an IP address, server universal unique identifier (UUID), a System-on-Chip (SOC) type, and a firmware version associated with the BMC.

15. The apparatus of claim 10, wherein the at least one processor is further configured to:

determine the current configuration of the BMC from the collected device information, wherein determining whether there is a configuration change to be applied to the BMC includes a comparison of the current configuration of the BMC with the reference configuration.

16. The apparatus of claim 10, wherein the at least one processor is further configured to:

monitor for events signaling changes in hardware configuration of a modular hardware system, wherein the BMC is discovered as a changed component in the modular hardware system; and initiate a build process to assemble a new firmware image compatible with the updated hardware setup of the modular hardware system in response to detecting the BMC as a changed component.

17. The apparatus of claim 10, wherein the configuration database maintains a configuration file for the BMC as a repository of attributes for operating the BMC.

18. A non-transitory computer-readable medium storing computer executable code for configuring a baseboard management controller (BMC), comprising code to:

discover the BMC within a network based on network scanning and listening for service discovery protocol messages;

collect device information from the BMC;

store the collected device information in a configuration database;

determine whether there is a configuration change to be applied to the BMC based on the collected device information and a reference configuration;

configure the BMC with updated settings to apply the configuration change, in response to determining that there is a configuration change to be applied;

determine whether there is a firmware change to be applied to the BMC based on the collected device information and the reference configuration;

construct a firmware build for the BMC, in response to determining that there is a firmware change to be applied; and update the firmware of the BMC based on the firmware build.

* * * * *